(12) United States Patent
Jackson

(10) Patent No.: US 6,711,169 B1
(45) Date of Patent: Mar. 23, 2004

(54) SESSION PROTECTION SYSTEM

(75) Inventor: Martin K. Jackson, Haverhill (GB)

(73) Assignee: Virata Limited, Cambridge (GB)

( * ) Notice: Subject to any disclaimer, the term of this patent is extended or adjusted under 35 U.S.C. 154(b) by 0 days.

(21) Appl. No.: 09/519,173

(22) Filed: Mar. 6, 2000

(30) Foreign Application Priority Data

Jul. 7, 1999 (GB) .............................................. 9915966

(51) Int. Cl.[7] .............................................. H04L 12/56
(52) U.S. Cl. ..................... 370/395.1; 370/397; 370/399
(58) Field of Search .............................. 379/395.1, 397, 379/399, 395.6

(56) References Cited

U.S. PATENT DOCUMENTS

| | | | |
|---|---|---|---|
| 5,319,712 A | 6/1994 | Finkelstein et al. | 380/44 |
| 5,870,479 A | 2/1999 | Feiken et al. | 380/49 |
| 5,920,627 A | 7/1999 | Mionet et al. | 380/21 |
| 6,052,786 A | 4/2000 | Tsuchida | 713/201 |

FOREIGN PATENT DOCUMENTS

| | | | | |
|---|---|---|---|---|
| EP | 0779727 | 6/1997 | ............ | H04L/29/06 |
| EP | 0837618 | 4/1998 | ............ | H04Q/11/04 |
| GB | 2276295 | 9/1994 | ............ | H04L/25/49 |
| JP | 11-41245 | 2/1999 | ............ | H04L/12/28 |

OTHER PUBLICATIONS

Chuang, Shaw–Cheng. "Securing ATM Networks," ACM Conference on Computer and Communications Security, US, New York, ACM, vol. CONF. 3, Mar. 14, 1996, pp. 19–30.

*Primary Examiner*—Kenneth Vanderpuye
(74) *Attorney, Agent, or Firm*—Pennie & Edmonds LLP

(57) ABSTRACT

A session protection system for an ATM packet switching network enables real-time data to be protected from unauthorised access. The usual rules for transmission/reception ensure ATM cells are delivered in the order transmitted, and with a consistent VP or VP/VC value. ATM defines an adaptation layer for transmitting packets through a VC, whereby adaptation layer endpoints break packets into cells and packet transmission relies on both rules for correct operation. The session protection system disrupts this control and employs at least one pseudo random number generator (PRG1,PRG2), located in a transmitting network element (A) to break at least one of the rules by either delivering cells in a different order or delivering ATM cells with a non-consistent VP or VP/VC value. At least one pseudo random number generator (PRG1,PRG2) at a receiving network element (B) either reassembles cells in the order of transmission, or with a consistent VP or VP/VC value respectively. Exchange keys are used to synchronise the pseudo random generators.

6 Claims, 1 Drawing Sheet

SESSION PROTECTION SYSTEM

BACKGROUND OF THE INVENTION

This invention relates to a session protection system which can be applied in a packet switching network especially one operating in an asynchronous transfer mode (ATM). It enables real-time data to be protected from unauthorised access.

It is desirable to protect data flowing through a network from unauthorised access. For example, PPV Services (pay per view) which deliver data for which a customer pays, such as video on demand, or real time news feeds, and the like, are all at risk of interception and unauthorised use. However, if analogue signals are being delivered by a cable TV system, protection can be provided by inserting spurious line synchronisation pulses. Alternatively, in digital systems, standard encryption techniques such as DES or triple DES are used to encode a payload stream. Typically DES encryption/decryption requires that additional hardware be incorporated into a design to meet the bit level processing requirements. For many real time services the value of the information is in the fact that it is being delivered in real time. Consequently it is possible to envisage other forms of protection which do not require this additional hardware. There are systems where the volume of data is very large, such as video on demand systems, which means that even simple encryption systems can be effective because of the amount of data.

As broadband access becomes more widely deployed, PPV services will become more prevalent and the connection point (or link) where the access network delivers data to the customer premises is potentially a point for unauthorised physical access to the service.

BRIEF SUMMARY OF THE INVENTION

The invention provides a system for protecting services delivered over an ATM link.

More particularly, the invention provides a packet switching system operating in ATM, wherein each cell has a header to identify a connection or link, the system including a controller to ensure that rules are followed to ensure:

i) ATM cells are delivered in the order transmitted, and ii) ATM cells are delivered with a consistent VP or VP/VC value said connection or link being either for a virtual path (VP), where cells are delivered with the same VP field but potentially different VC fields; or a virtual circuit (VC), where cells are delivered with the same VP and VC fields, the VP and VC fields being contained within the cell header and negotiated on a link by link basis but being static for a link, said ATM defining an adaptation layer for transmitting packets through a VC, whereby the adaptation layer ATM endpoints beak packets into cells and the transmission of packets through the network relies on both of said rules for correct operation;

the packet switching system further including a session protection system which disrupts the controller and employs a pseudo random number generator, located in a transmitting network element to break at least one of said rules by:

(a) either delivering ATM cells in an order differing from that in which they were transmitted, (b) or delivering ATM cells with a non-consistent VP or VP/VC value, and which also employs a further pseudo random number generator located in a receiving network element either to reassemble the received ATM cells so that they are in the order of transmission, or so that they have a consistent VP or VP/VC value respectively, the session protection system providing said network elements with exchange keys to synchronise said pseudo random generators.

Whilst the session protection system can break one or other of the above rules, it can break both for more security.

The pseudo random number generators may be controlled by parameters which depend on (a) number of cells over which to reorder, (b) maximum packet size expected, or (c) communication delay variation, or any combination or permutation of these parameters.

Where there is only one active VC, preferably dummy stream of cells is generated to interleave with the real stream of cells to avoid the possibility of data interception by an unauthorised user, where all cells could be captured regardless of their cell header. This is useful when breaking the second rule (ii).

Where errors may occur causing corruption of cells, bad cells could be kept until reassembled (to deal with rule (i)), and the time of arrival of cells could be noted, cells being transmitted across a link on a fixed rate, whereby arriving cells are null if they do not contain data from an active VC.

BRIEF DESCRIPTION OF THE DRAWINGS

Preferred embodiments of the invention will now be described by way of example, having reference to the accompanying drawing in which.

DETAILED DESCRIPTION OF THE INVENTION

Figure 1:
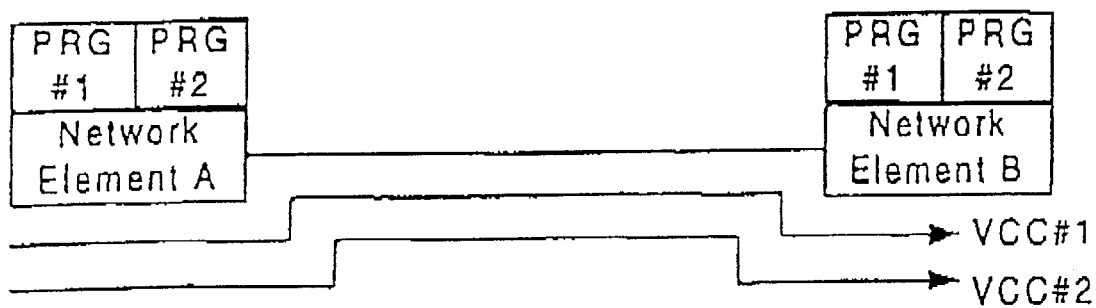
FIG. 1 schematically illustrates two virtual circuits, with data flowing between two network elements A and B.

Before describing an embodiment of the invention, some comments will be made on ATM.

Each cell has a header associated with it to identify the connection. The ATM Forum and ITU-T have established a set of recommendations for setting up connections using out of band signalling, traffic management, etc. Once a connection has been set up them ATM guarantees that cells will be received in the order in which they were transmitted but at a time within specified limits as defamed in the traffic contract. If the connection is a virtual path then cells will be delivered with the same VP field but potentially different VC fields; if the connection is a virtual circuit then the cells will be delivered with the same VP and VC fields. The VP and VC fields are contained within the cell header and are negotiated on a link by link basis but are static, as described above, for a link.

To reiterate:

i) ATM cells are guaranteed to be delivered in the order transmitted ii) ATM cells of a connection are delivered with a consistent VP or VP/VC value ATM defines a number of adaptation layers, for example: AAL1, AAL2 and AAL5. AAL5 is typically used when packets of data have to be transmitted through a VC. When using AAL5 ATM endpoints break packets into cells; all cells with the exception of the last cell are undifferentiated from one another—the last cell sets a bit in the cell header and inserts an AAL5 trailer containing a checksum of the cells which make up a payload within the final cell. The transmission of AAL5 packets through a network relies on both of the above rules for correct operation. Examples of protocols which may use AAL5 include both MPEG and IP; in both cases multiple cells are required to make up an entire MPEG or IP packet.

The invention is designed to provide protection of traffic at a link level. It does this by breaking, at a link level, either or both of the two rules (i) and (ii) above.

Referring to FIG. 1 which schematically illustrates two virtual circuits set up flowing between network element A and network element B, in a conventional ATM system an eavesdropper, or rogue network element, would be able to examine cells as they entered and quickly have access to the information because of the two aforementioned rules. In the preferred embodiment of the invention, however, network element A and B exchange keys, using well known mechanisms outside the scope of this invention and use the keys to synchronise two pseudo random number generators, PRG#1 and PRG#2.

Consider now the case of breaking rule (i) (cells are transmitted in the order received). In this case Network Element A will re-order the cells that it has to transmit based upon some function of PRG#1; parameters for such a function might include the number of cells over which to re-order, maximum packet size expected, the connections cell delay variation (CDV) etc. Consider the case that the cells consist of AAL5 packets then breaking rule (i) means that cells appearing on the link between network elements A and B can no longer be associated with a particular AAL5 packet. In order to re-assemble the cells into their correct AAL5 packets an eavesdropper will have to try the received cells in all possible positions—a potentially prohibitive calculation of exponential complexity. Network element B, which maintains a synchronised PRG, can easily decode the received stream by suitably delaying the received cells prior to re-assembly. As is usual in session protections systems security could be further enhanced by changing keys regularly.

Consider now the case for breaking rule (ii) (cells are transmitted on a consistent VP/VC across a link). In this case Network Element A changes the VP/VC identifier based upon some function of PRG#1 and transmits the resultant cells to Network Element B. For an eavesdropper the situation is now similar to that of a frequency hopped CDMA system—unless the key is known it will not be possible to associate a cell with a particular VC. Therefore, once again, an eavesdropper has a problem of considerable complexity to solve it in order to recover the data from the virtual circuit or virtual path that is the target of interception.

In the case of breaking rule (ii), there is an additional consideration for the case that there is only one active VC. In this situation the eavesdropper can trivially intercept data by capturing all cells regardless of their cell header. In such a case it would be necessary to generate a dummy stream of cells to interleave with the real stream.

Systems may choose to break rule (i), rule (ii) or both and use one or more pseudo random number generators to achieve link security. In such a system it is probable that errors will cause cells to become corrupted; "rule (i)" breaking just requires that Network Element B mark keep bad cells until re-assembly is required; "rule (ii)" breaking presents a slight harder problem but could, for example, be overcome by the receiver noting when cells arrive—cells are transmitted across the link at a fixed rate, they are null cells if they don't contain data from an active VC.

What is claimed is:

1. A packet system operating in ATM, wherein each cell has a header to identify a connection or link, the system including a controller to ensure that rules are followed to ensure:

i) ATM cells are delivered in the order transmitted, and ii) ATM cells are delivered with a consistent VP or VP/VC value said connection or link being either for a virtual path (VP), where cells are delivered with the same VP field but potentially different VC fields; or a virtual circuit (VC), where cells are delivered with the same VP and VC fields, the VP and VC fields being contained within the cell header and negotiated on a link by link basis but being static for a link, said ATM defining an adaptation layer for transmitting packets through a VC, whereby the adaptation layer ATM endpoints break packets into cells and the transmission of packets through the network relies on both of said rules for correct operation;

the packet switching system further including a session protection system which disrupts the controller and employs a pseudo random number generator, located in a transmitting network element to break at least one of said rules by:

(a) either delivering ATM cells in an order differing from that in which they were transmitted, (b) or delivering ATM cells with a non-consistent VP or VP/VC value, and which also employs a further pseudo random number generator located in a receiving network element either to reassemble the received ATM cells so that they are in the order of transmission, or so that they have a consistent VP or VP/VC value respectively, the session protection system providing said network elements with exchange keys to synchronise said pseudo random generators.

2. A packet switching system according to claim 1, wherein session protection system breaks both of said rules.

3. A packet switching system according to claim 1, wherein parameters for controlling the pseudorandom number generator include any one or more of (a) the number of cells over which to re-order, (b) maximum packet size expected, (b) a connections delay variation (CDV).

4. A packet switching system according to any preceding claim, wherein there is only one active VC, and where a dummy stream of cells is generated to interleave with the real stream of cells.

5. A packet switching system according to any preceding claim, wherein errors can occur that cause cells to become corrupted, and with regard to rule (i), the receiver network element marks bad cells to be kept until re-assembly is required; and with regard to rule (ii) the receiver element notes when cells arrive, whether cells are transmitted across the link at a fixed rate; cells being treated as null cells if they do not contain data from an active VC.

6. A packet switching system according to an preceding claim, wherein said adaptation layer is one of ATM layers AAL1, AAL2 or AAL5.

* * * * *